3,083,212
TESTOLOLACTONE DERIVATIVES

Richard William Thoma, Somerville, and Josef Fried, Princeton, N.J., assignors to Olin Mathieson Chemical Corporation, New York, N.Y., a corporation of Virginia
No Drawing. Filed Nov. 10, 1961, Ser. No. 151,433
4 Claims. (Cl. 260—343.2)

This invention relates to the production of 16-keto-$\Delta^1$-testololactone, 16$\alpha$-hydroxy-$\Delta^1$-testololactone and esters of the latter wtih hydrocarbon carboxylic acids having less than ten carbon atoms.

16$\alpha$-hydroxy-$\Delta^1$-testololactone is prepared by subjecting $\Delta^1$-testololactone to the action of the enzymes of the microorganism *Streptomyces roseochromogenes* under oxidizing conditions, the oxidation being effected either by including the starting material in an aerobic culture of the microorganism, or by bringing together, in an aqueous medium, the substrate, air and enzymes or non-proliferating cells of the microorganism.

In general, the conditions for culturing *Streptomyces roseochromogenes* for the purposes of this invention are (except for the inclusion of the compound to be converted) the same as those for obtaining cultures of various other actinomycetes for the production of antibiotics and/or vitamin $B_{12}$, i.e., the microorganism is aerobically grown in contact with a suitable fermentation medium. A suitable medium essentially comprises a source of nitrogen and a source of carbon and energy. The latter may be a carbohydrate (such as sucrose, molasses, glucose, maltose, starch or dextrin), a fatty acid, a fat and/or the starting material itself. Preferably, however, the medium includes an assimilable source of carbon and energy in addition to the compound to be converted.

The source of nitrogenous factors may be organic (e.g., soybean meal, corn steep liquor, meat extract and/or distillers solubles) or synthetic (i.e., composed of simple, synthesizable organic or inorganic compounds such as ammonium salts, alkali nitrates, amino acids or urea).

An adequate, sterile air supply should be maintained during fermentation, for example, by the conventional methods of exposing a large surface of the medium to air, or by utilizing submerged aerated cultures. The substrate may be added to the culture during the incubation period, or included in the medium prior to sterilization or inoculation. The preferred (but not limiting) range of concentration of the substrate in the culture is about 0.01 to 0.10%. The culture period may vary considerably, the range of about 6 to 96 hours being feasible, but not limiting.

This process yields 16$\alpha$-hydroxy-$\Delta^1$-testololactone.

16$\alpha$-hydroxy-$\Delta^1$-testololactone forms esters with organic hydrocarbon carboxylic acids of less than ten carbon atoms, e.g., the lower alkanoic acids as exemplified by acetic, propionic and enanthic acid, the lower alkenoic acids, the aralkanoic acids as exemplified by $\alpha$-toluic and $\beta$-phenylpropionic, the cycloalkane carboxylic acids, the cycloalkane carboxylic acids, and the aromatic acids as exemplified by benzoic and o, m, or p-toluic acid. The esters of 16$\alpha$-hydroxy-$\Delta^1$-testololactone are prepared by treatment of 16$\alpha$-hydroxy-$\Delta^1$-testololactone with the acid anhydride or acyl halide containing the desired acid group in an organic solvent (preferably an organic base such as pyridine).

16$\alpha$-hydroxy-$\Delta^1$-testololactone may be converted to 16-keto-$\Delta^1$-testololactone by oxidation, e.g. by treatment with chromium trioxide in the presence of sulfuric acid.

The compounds of this invention have protein anabolic activity and are useful in the treatment of underweight patients to effect the rapid build-up of protein stores. They may be administered orally in conventional oral dosage forms.

The following examples are illustrative of the invention.

EXAMPLE I

*16$\alpha$-Hydroxy-$\Delta^1$-Testololactone*

(a) *Fermentation.*—Surface growth from two to four week old agar slant cultures of *Streptomyces roseochromogenes*, (WC 3689—Institute of Microbiology, Rutgers University, New Brunswick, New Jersey), the slant containing a nutrient medium A:

| | |
|---|---|
| Glucose | g 10 |
| Yeast extract | g 2.5 |
| $K_2HPO_4$ | g 1 |
| Agar | g 20 |
| Distilled water to 1 liter | | is suspended in 5.0 ml. of an 0.01% Duponal (wetting agent) aqueous solution. One ml. portions of the suspension from two or more slants are used to inoculate ten 250 ml. conical flasks, each containing 50 ml. of the following sterilized medium B:

| | |
|---|---|
| Soybean meal | g 15 |
| Glucose | g 10 |
| Soybean oil | g 2.2 |
| $CaCO_3$ | g 2.5 |
| Distilled water to 1 liter. | |

After 69½ hours incubation at 25° with continuous rotary agitation (280 cycles per minute; 2 inch radius), 10% (vol./vol.) transfers are made to 79 conical flasks each containing 50 ml. of freshly sterilized medium B. Immediately after inoculation, $\Delta^1$-testololactone is added to each flask as 0.25 ml. of a sterile solution containing 12.5 mg. of the compound in N,N-dimethylformamide. A total of 987 mg. is used. After 50 hours of further incubation, the contents of the flasks are pooled and the pH adjusted to 4.0 with about 15 ml. of $12NH_2SO_4$. The broth is filtered through a Seitz clarifying pad using Hy-Flo Filter Aid. The flasks are rinsed with 400 ml. of water, the cake is reslurried, filtered and the filtrates combined to give about 3500 ml.

(b) *Isolation and characterization.*—The combined filtrate and washings are extracted four times with 800 ml. portions of chloroform. The combined chloroform extracts are filtered and evaporated to dryness in vacuo. The residue is taken up in 100 ml. of 80% methanol and an equal volume of hexane. After thorough shaking and separation of the layers, the methanol extract is freed from methanol, the residual aqueous suspension extracted with chloroform, the chloroform extract dried over sodium sulfate and evaporated to dryness in vacuo. The crude residue (991 mg.) is triturated with acetone-hexane to yield 464 mg. of 16$\alpha$-hydroxy-$\Delta^1$-testololactone, M.P. 196–198 213–214° C.; $[\alpha]_D^{23}$ −68° (C, 0.53 in $CHCl_3$);

$\lambda_{max.}^{alc.}$ 240 m$\mu$ ($\epsilon$=15,600); $\lambda_{max.}^{Nujol}$ 3.05, 5.81, 6.06, 6.21, 6.27, and 11.28$\mu$.

*Analysis.*—Calcd. for $C_{19}H_{24}O_4$ (316.38): C, 72.12; H, 7.65. Found: C, 72.07; H, 7.56.

EXAMPLE II

*16$\alpha$-Acetoxy-$\Delta^1$-Testololactone*

A solution of 26 mg. of 16$\alpha$-hydroxy-$\Delta^1$-testololactone in 1 ml. of dry pyridine and ½ ml. of acetic anhydride is allowed to stand at room temperature overnight. Removal of the reagents in vacuo leaves a residue (29 mg.), which after recrystallization from acetone-hexane furnishes the pure acetyl derivative possessing the following properties: M.P. 258–260°; $[\alpha]_D^{23}$ −150° (c, .37 in chlf.); $\lambda_{max.}^{Nujol}$ 5.74, 5.80, 6.01, 6.18, 6.24 and 8.05$\mu$.

*Analysis.*—Calcd. for $C_{21}H_{26}O_5$ (358.42): C, 70.37; H, 7.31. Found: C, 70.81; H, 7.07.

EXAMPLE III

16-Keto-$\Delta^1$-Testololactone

To a solution of 1 g. of 16α-hydroxy-$\Delta^1$-testololactone in 100 ml. of pure acetone is added slowly with stirring 1.4 ml. of a solution of 200 mg. of chromium trioxide and 320 mg. of concentrated sulfuric acid per milliliter of water. After 35 minutes a few drops of ethanol are added followed by 50 ml. of water. The acetone is evaporated in vacuo and the aqueous suspension extracted with chloroform. The chloroform extract is washed with sodium bicarbonate solution and water, dried over sodium sulfate and evaporated to dryness in vacuo. The crude residue (880 mg.) is crystallized from acetone and a little hexane furnishing pure 16-keto-$\Delta^1$-testololactone (700 mg.) possessing the following properties: M.P. 262–264°; $[\alpha]_D^{23}$ —120° (c, .40 in chlf.);

$\lambda_{max}^{alc.}$ 242 m$\mu$ ($\epsilon$=17,400); $\lambda_{max}^{Nujol}$ 5.74, shoulder at 5.78, 6.03, 6.18 and 6.26$\mu$.

*Analysis.*—Calcd. for $C_{19}H_{22}O_4$ (314.36): C, 72.59; H, 7.05. Found: C, 72.71; H, 7.19.

What is claimed is:

1. A compound selected from the group consisting of 16 - keto-$\Delta^1$-testololactone, 16α-hydroxy-$\Delta^1$-testololactone and an ester of the latter with an unsubstituted carboxylic acid having less than ten carbon atoms selected from the group consisting of lower alkanoic acids, monocyclic aryl carboxylic acids, monocyclic aryl lower alkanoic carboxylic acids, cycloalkane carboxylic acids and cycloalkene carboxylic acids.
2. 16α-hydroxy-$\Delta^1$-testololactone.
3. 16α-hydroxy-$\Delta^1$-testololactone acetate.
4. 16-keto-$\Delta^1$-testololactone.

References Cited in the file of this patent

UNITED STATES PATENTS

| | | |
|---|---|---|
| 2,755,289 | Picka | July 17, 1956 |
| 2,946,807 | Fried et al. | July 26, 1960 |
| 2,982,693 | Goodman et al. | May 2, 1961 |
| 2,991,230 | Kita | July 4, 1961 |
| 3,005,829 | Wendler | Oct. 24, 1961 |

FOREIGN PATENTS

| | | |
|---|---|---|
| 792,803 | Great Britain | Apr. 2, 1958 |